US007174314B2

(12) United States Patent
Phillips et al.

(10) Patent No.: US 7,174,314 B2
(45) Date of Patent: *Feb. 6, 2007

(54) DEBIT PURCHASING OF STORED VALUE CARD FOR USE BY AND/OR DELIVERY TO OTHERS

(75) Inventors: Gregory Joseph Phillips, Landenberg, PA (US); Rebecca Deporte, Landenberg, PA (US); Jeffrey Norwine, Wilmington, DE (US); Penny Joines, Media, PA (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/987,078

(22) Filed: Nov. 15, 2004

(65) Prior Publication Data

US 2005/0092828 A1 May 5, 2005

Related U.S. Application Data

(63) Continuation of application No. 10/441,067, filed on May 20, 2003, now Pat. No. 6,892,187, which is a continuation of application No. 09/102,044, filed on Jun. 22, 1998, now Pat. No. 6,615,189.

(51) Int. Cl.
*G06Q 40/00* (2006.01)
(52) U.S. Cl. ...................................................... 705/41
(58) Field of Classification Search .................. 705/1, 705/14, 26, 41
See application file for complete search history.

(56) References Cited

U.S. PATENT DOCUMENTS

| 3,634,669 A | 1/1972 | Soumas et al. |
| 3,946,206 A | 3/1976 | Darjany |
| 4,047,033 A | 9/1977 | Malmberg |
| 4,465,206 A | 8/1984 | Sorel et al. |
| 4,545,838 A | 10/1985 | Minkus |
| 4,582,985 A | 4/1986 | Lofberg |
| 4,594,663 A | 6/1986 | Nagata et al. |

(Continued)

FOREIGN PATENT DOCUMENTS

CA 2293321 12/1998

(Continued)

OTHER PUBLICATIONS

Song, Time Magazine Article, Monday, Apr. 12, 2004, "A Card that asks for ID", 1 page.

(Continued)

*Primary Examiner*—Susanna M. Diaz
(74) *Attorney, Agent, or Firm*—Hunton & Williams LLP

(57) ABSTRACT

A method of issuing a purchase card is provided. The method includes the steps of presenting a purchaser with the opportunity to buy the purchase card, determining whether the purchaser has sufficient funds to pay for the purchase card, creating a purchase card account for a recipient designated by the purchaser, and issuing the purchase card. The purchase card may also be issued in connection with another credit card, for example as a rebate for purchases on the credit card. The purchase card may also be converted to a credit card.

18 Claims, 2 Drawing Sheets

U.S. PATENT DOCUMENTS

| | | |
|---|---|---|
| 4,614,861 A | 9/1986 | Pavlov et al. |
| 4,634,845 A | 1/1987 | Riley |
| 4,642,768 A | 2/1987 | Roberts |
| 4,689,478 A | 8/1987 | Hale et al. |
| 4,700,055 A | 10/1987 | Kashkashian |
| 4,746,787 A | 5/1988 | Okada |
| 4,750,119 A | 6/1988 | Cohen |
| 4,752,676 A | 6/1988 | Leonard et al. |
| 4,754,418 A | 6/1988 | Hara |
| 4,766,293 A | 8/1988 | Boston |
| 4,766,539 A | 8/1988 | Fox |
| 4,789,928 A | 12/1988 | Fujisaki |
| 4,822,985 A | 4/1989 | Boggan et al. |
| 4,831,242 A | 5/1989 | Englehardt |
| 4,831,526 A | 5/1989 | Luchs |
| 4,868,376 A | 9/1989 | Lessin et al. |
| 4,870,259 A | 9/1989 | Boggan et al. |
| 4,882,675 A | 11/1989 | Nichtberger |
| 4,897,533 A | 1/1990 | Lyszczarz |
| 4,906,826 A | 3/1990 | Spencer |
| 4,908,521 A | 3/1990 | Boggan et al. |
| 4,923,288 A | 5/1990 | Allen et al. |
| 4,928,001 A | 5/1990 | Masada |
| 4,941,090 A | 7/1990 | McCarthy |
| 4,943,707 A | 7/1990 | Boggan |
| 4,953,085 A | 8/1990 | Atkins |
| 4,954,985 A | 9/1990 | Yamazaki |
| 4,961,142 A | 10/1990 | Atkins |
| 4,968,873 A | 11/1990 | Dethloff et al. |
| 4,975,840 A | 12/1990 | DeTore et al. |
| 4,978,401 A | 12/1990 | Bonomi |
| 4,992,940 A | 2/1991 | Dworkin |
| 5,025,372 A | 6/1991 | Burton |
| 5,049,728 A | 9/1991 | Rovin |
| 5,055,662 A | 10/1991 | Hasegawa |
| 5,080,748 A | 1/1992 | Bonomi |
| 5,095,194 A | 3/1992 | Barbanell |
| 5,117,355 A | 5/1992 | McCarthy |
| 5,146,068 A | 9/1992 | Ugawa et al. |
| 5,175,416 A | 12/1992 | Mansvelt |
| 5,180,901 A | 1/1993 | Hiramatsu |
| 5,192,947 A | 3/1993 | Neustein |
| 5,202,286 A | 4/1993 | Nakatani |
| 5,202,826 A | 4/1993 | McCarthy |
| 5,206,488 A | 4/1993 | Teicher |
| 5,206,803 A | 4/1993 | Vitagliano |
| 5,218,631 A | 6/1993 | Katz |
| 5,247,190 A | 9/1993 | Friend et al. |
| 5,276,311 A | 1/1994 | Hennige |
| 5,287,268 A | 2/1994 | McCarthy |
| 5,287,269 A | 2/1994 | Dorrough |
| 5,297,026 A | 3/1994 | Hoffman |
| 5,311,594 A | 5/1994 | Penzias |
| 5,326,959 A | 7/1994 | Perazza |
| 5,326,960 A | 7/1994 | Tannenbaum |
| 5,328,809 A | 7/1994 | Holmes et al. |
| 5,339,239 A | 8/1994 | Manabe et al. |
| 5,349,633 A | 9/1994 | Katz |
| 5,350,906 A | 9/1994 | Brody et al. |
| 5,359,183 A | 10/1994 | Skodlar |
| 5,365,575 A | 11/1994 | Katz |
| 5,383,113 A | 1/1995 | Knight |
| 5,397,881 A | 3/1995 | Mannik |
| 5,399,502 A | 3/1995 | Friend et al. |
| 5,401,827 A | 3/1995 | Holmes et al. |
| RE34,915 E | 4/1995 | Nichtberger et al. |
| 5,424,524 A | 6/1995 | Ruppert |
| 5,450,477 A | 9/1995 | Amarant |
| 5,453,601 A | 9/1995 | Rosen |
| 5,455,407 A | 10/1995 | Rosen |
| 5,459,306 A | 10/1995 | Stein |
| 5,465,206 A | 11/1995 | Hilt |
| 5,466,919 A | 11/1995 | Hovakimian |
| 5,471,669 A | 11/1995 | Lidman |
| 5,477,038 A | 12/1995 | Levine |
| 5,477,040 A | 12/1995 | Lalonde |
| 5,479,494 A | 12/1995 | Clitherow |
| 5,482,139 A | 1/1996 | Rivalto |
| 5,483,444 A | 1/1996 | Heintzeman |
| 5,483,445 A | 1/1996 | Pickering |
| 5,500,514 A | 3/1996 | Veeneman |
| 5,511,114 A | 4/1996 | Stimson |
| 5,512,654 A | 4/1996 | Holmes et al. |
| 5,513,102 A | 4/1996 | Auriemma |
| 5,521,363 A | 5/1996 | Tannenbaum |
| 5,530,232 A | 6/1996 | Taylor |
| 5,530,235 A | 6/1996 | Stefik |
| 5,537,314 A | 7/1996 | Kanter |
| 5,544,086 A | 8/1996 | Davis |
| 5,544,246 A | 8/1996 | Mandelbaum |
| 5,553,120 A | 9/1996 | Katz |
| 5,577,109 A | 11/1996 | Stimson |
| 5,578,808 A | 11/1996 | Taylor |
| 5,581,064 A | 12/1996 | Riley et al. |
| 5,585,787 A | 12/1996 | Wallerstein |
| 5,590,038 A | 12/1996 | Pitroda |
| 5,592,560 A | 1/1997 | Deaton et al. |
| 5,604,542 A | 2/1997 | Dedrick |
| 5,608,785 A | 3/1997 | Kasday |
| 5,612,868 A | 3/1997 | Off |
| 5,621,787 A | 4/1997 | Mckoy |
| 5,621,812 A | 4/1997 | Deaton et al. |
| 5,637,845 A | 6/1997 | Kolls |
| 5,638,457 A | 6/1997 | Deaton et al. |
| 5,642,279 A | 6/1997 | Stone |
| 5,642,485 A | 6/1997 | Deaton et al. |
| 5,644,723 A | 7/1997 | Deaton et al. |
| 5,644,727 A | 7/1997 | Atkins |
| 5,649,114 A | 7/1997 | Deaton et al. |
| 5,649,117 A | 7/1997 | Landry |
| 5,649,118 A | 7/1997 | Carlisle |
| 5,653,914 A | 8/1997 | Holmes et al. |
| 5,659,741 A | 8/1997 | Eberhardt |
| 5,664,110 A | 9/1997 | Green |
| 5,664,157 A | 9/1997 | Takahira et al. |
| 5,665,953 A | 9/1997 | Mazzamuto |
| 5,672,678 A | 9/1997 | Holmes et al. |
| 5,675,607 A | 10/1997 | Alesio |
| 5,675,662 A | 10/1997 | Deaton et al. |
| 5,677,955 A | 10/1997 | Doggett |
| 5,684,291 A | 11/1997 | Taskett |
| 5,687,322 A | 11/1997 | Deaton et al. |
| 5,689,100 A | 11/1997 | Carrithers |
| 5,689,650 A | 11/1997 | McClelland |
| 5,692,132 A | 11/1997 | Hogan |
| 5,696,907 A | 12/1997 | Tom |
| 5,699,528 A | 12/1997 | Hogan |
| 5,703,344 A | 12/1997 | Bezy |
| 5,704,046 A | 12/1997 | Hogan |
| 5,705,798 A | 1/1998 | Tarbox |
| 5,708,422 A | 1/1998 | Blonder |
| 5,710,458 A | 1/1998 | Iwasaki |
| 5,710,886 A | 1/1998 | Christensen |
| 5,710,887 A | 1/1998 | Chelliah |
| 5,710,889 A | 1/1998 | Clark et al. |
| 5,715,399 A | 2/1998 | Bezos |
| 5,717,925 A | 2/1998 | Harper et al. |
| 5,721,768 A | 2/1998 | Stimson |
| 5,721,781 A | 2/1998 | Deo et al. |
| 5,726,884 A | 3/1998 | Sturgeon et al. |
| 5,727,153 A | 3/1998 | Powell |
| 5,728,998 A | 3/1998 | Novis et al. |
| 5,729,693 A | 3/1998 | Holda-Fleck |
| 5,734,154 A | 3/1998 | Jachimowicz et al. |

| | | | | | | |
|---|---|---|---|---|---|---|
| 5,734,838 A | 3/1998 | Robinson | 5,930,217 A | 7/1999 | Kayanuma | |
| 5,736,728 A | 4/1998 | Matsubara | 5,931,764 A | 8/1999 | Freeman et al. | |
| 5,737,421 A | 4/1998 | Holda-Fleck | 5,933,817 A | 8/1999 | Hucal | |
| 5,740,549 A | 4/1998 | Reilly et al. | 5,937,068 A | 8/1999 | Audebert | |
| 5,742,775 A | 4/1998 | King | 5,940,811 A | 8/1999 | Norris | |
| 5,745,049 A | 4/1998 | Akiyama et al. | 5,952,641 A | 9/1999 | Korshun | |
| 5,745,706 A | 4/1998 | Wolfberg et al. | 5,953,423 A | 9/1999 | Rosen | |
| 5,749,075 A | 5/1998 | Toader et al. | 5,953,710 A | 9/1999 | Fleming | |
| 5,760,381 A | 6/1998 | Stich et al. | 5,955,961 A | 9/1999 | Wallerstein | |
| 5,765,138 A | 6/1998 | Aycock et al. | 5,956,695 A * | 9/1999 | Carrithers et al. | 705/14 |
| 5,765,141 A | 6/1998 | Spector | 5,963,648 A | 10/1999 | Rosen | |
| 5,770,843 A | 6/1998 | Rose | 5,970,479 A | 10/1999 | Shepherd | |
| 5,770,849 A | 6/1998 | Novis et al. | 5,970,480 A | 10/1999 | Kalina | |
| 5,774,870 A | 6/1998 | Storey | 5,974,399 A | 10/1999 | Giuliani et al. | |
| 5,777,305 A | 7/1998 | Smith | RE036,365 E | 11/1999 | Levine et al. | |
| 5,777,306 A | 7/1998 | Masuda | 5,984,180 A * | 11/1999 | Albrecht | 235/380 |
| 5,777,903 A | 7/1998 | Piosenka et al. | 5,984,191 A | 11/1999 | Chapin, Jr. | |
| 5,778,067 A | 7/1998 | Jones et al. | 5,987,434 A | 11/1999 | Libman | |
| 5,787,156 A | 7/1998 | Katz | 5,988,509 A | 11/1999 | Taskett | |
| 5,787,404 A | 7/1998 | Fernandez-Holmann | 5,991,413 A | 11/1999 | Arditti et al. | |
| 5,789,733 A | 8/1998 | Jachimowicz et al. | 5,991,743 A | 11/1999 | Irving et al. | |
| 5,794,207 A | 8/1998 | Walker | 5,991,748 A | 11/1999 | Taskett | |
| 5,799,087 A | 8/1998 | Rosen | 5,991,750 A | 11/1999 | Watson | |
| 5,802,176 A | 9/1998 | Audebert | 6,000,608 A | 12/1999 | Dorf | |
| 5,805,719 A | 9/1998 | Pare et al. | 6,000,832 A | 12/1999 | Franklin et al. | |
| 5,806,042 A | 9/1998 | Kelly | 6,002,383 A | 12/1999 | Shimada | |
| 5,806,044 A | 9/1998 | Powell | 6,003,762 A | 12/1999 | Hayashida | |
| 5,806,045 A | 9/1998 | Biorge | 6,004,681 A | 12/1999 | Epstein et al. | |
| 5,807,627 A | 9/1998 | Friend et al. | 6,006,988 A | 12/1999 | Behrmann et al. | |
| 5,809,478 A | 9/1998 | Greco | 6,009,415 A | 12/1999 | Shurling et al. | |
| 5,815,657 A | 9/1998 | Williams et al. | 6,014,636 A | 1/2000 | Reeder | |
| 5,815,658 A | 9/1998 | Kuriyama | 6,014,638 A | 1/2000 | Burge et al. | |
| 5,819,234 A | 10/1998 | Slavin et al. | 6,014,645 A | 1/2000 | Cunningham | |
| 5,819,237 A | 10/1998 | Garman | 6,014,749 A | 1/2000 | Gloor et al. | |
| 5,832,457 A | 11/1998 | O'Brien | 6,016,482 A | 1/2000 | Molinari et al. | |
| 5,832,488 A | 11/1998 | Eberhardt | 6,016,954 A | 1/2000 | Abe et al. | |
| 5,835,061 A | 11/1998 | Stewart | 6,019,284 A | 2/2000 | Freeman et al. | |
| 5,835,576 A | 11/1998 | Katz | 6,026,370 A | 2/2000 | Jermyn | |
| 5,839,113 A | 11/1998 | Federau et al. | 6,029,139 A | 2/2000 | Cunningham et al. | |
| 5,845,259 A | 12/1998 | West | 6,029,890 A | 2/2000 | Austin | |
| 5,845,260 A | 12/1998 | Nakano et al. | 6,032,136 A | 2/2000 | Brake, Jr. et al. | |
| 5,852,811 A | 12/1998 | Atkins | 6,036,099 A | 3/2000 | Leighton | |
| 5,852,812 A | 12/1998 | Reeder | 6,038,292 A | 3/2000 | Thomas | |
| 5,857,079 A | 1/1999 | Claus | 6,038,552 A | 3/2000 | Fleischl et al. | |
| 5,857,175 A | 1/1999 | Day | 6,041,315 A | 3/2000 | Pollin | |
| 5,857,709 A | 1/1999 | Chock | 6,045,042 A | 4/2000 | Ohno | |
| 5,859,419 A | 1/1999 | Wynn | 6,047,067 A | 4/2000 | Rosen | |
| 5,864,609 A | 1/1999 | Cross | 6,047,268 A | 4/2000 | Bartoli et al. | |
| 5,864,828 A | 1/1999 | Atkins | 6,049,463 A | 4/2000 | O'Malley et al. | |
| 5,864,830 A | 1/1999 | Armetta | 6,049,773 A | 4/2000 | McCormack et al. | |
| RE36,116 E | 2/1999 | McCarthy | 6,049,782 A | 4/2000 | Gottesman et al. | |
| 5,870,718 A | 2/1999 | Spector | 6,058,378 A | 5/2000 | Clark et al. | |
| 5,870,721 A | 2/1999 | Norris | 6,064,985 A | 5/2000 | Anderson | |
| 5,875,437 A | 2/1999 | Atkins | 6,065,675 A | 5/2000 | Teicher | |
| 5,883,377 A | 3/1999 | Chapin, Jr. | 6,068,183 A | 5/2000 | Freeman et al. | |
| 5,883,810 A | 3/1999 | Franklin | 6,070,067 A | 5/2000 | Nguyen et al. | |
| 5,884,271 A | 3/1999 | Pitroda | 6,070,147 A | 5/2000 | Harms et al. | |
| 5,884,278 A | 3/1999 | Powell | 6,070,153 A | 5/2000 | Simpson | |
| 5,884,285 A | 3/1999 | Atkins | 6,076,068 A | 6/2000 | DeLapa et al. | |
| 5,887,065 A | 3/1999 | Audebert | 6,076,072 A | 6/2000 | Libman | |
| 5,890,138 A | 3/1999 | Godin et al. | 6,078,888 A | 6/2000 | Johnson, Jr. | |
| 5,890,140 A | 3/1999 | Clark et al. | 6,078,891 A | 6/2000 | Riordan et al. | |
| H001794 H | 4/1999 | Claus | 6,091,817 A | 7/2000 | Bertina et al. | |
| 5,897,620 A | 4/1999 | Walker et al. | 6,092,056 A | 7/2000 | Tull, Jr. et al. | |
| 5,905,246 A | 5/1999 | Fajkowski | 6,095,412 A | 8/2000 | Bertina et al. | |
| 5,911,135 A | 6/1999 | Atkins | 6,095,416 A | 8/2000 | Grant et al. | |
| 5,911,136 A | 6/1999 | Atkins | 6,098,053 A | 8/2000 | Slater | |
| 5,914,472 A | 6/1999 | Foladare et al. | 6,105,011 A | 8/2000 | Morrison, Jr. | |
| 5,920,629 A | 7/1999 | Rosen | 6,105,865 A | 8/2000 | Hardesty | |
| 5,920,844 A | 7/1999 | Hotta et al. | 6,115,458 A | 9/2000 | Taskett | |
| 5,920,847 A | 7/1999 | Kolling et al. | 6,119,932 A | 9/2000 | Maloney et al. | |
| 5,923,734 A | 7/1999 | Taskett | 6,122,623 A | 9/2000 | Garman | |
| 5,926,800 A | 7/1999 | Baronowski | 6,128,598 A | 10/2000 | Walker et al. | |

| | | | | | | |
|---|---|---|---|---|---|---|
| 6,128,599 | A | 10/2000 | Walker et al. | 6,802,008 B1 | 10/2004 | Ikefuji et al. |
| 6,129,274 | A | 10/2000 | Suzuki | 6,805,287 B2 | 10/2004 | Bishop |
| 6,134,536 | A | 10/2000 | Shepherd | 6,865,547 B1 | 3/2005 | Brake, Jr. et al. |
| 6,138,917 | A | 10/2000 | Chapin, Jr. | 6,868,426 B1 | 3/2005 | Mankoff |
| 6,145,741 | A | 11/2000 | Wisdom et al. | 6,876,971 B1 | 4/2005 | Burke |
| 6,148,297 | A | 11/2000 | Swor et al. | 6,901,372 B1 | 5/2005 | Helzerman |
| 6,161,096 | A | 12/2000 | Bell | 7,006,992 B1 | 2/2006 | Packwood |
| 6,163,770 | A | 12/2000 | Gamble et al. | 2001/0011243 A1 | 8/2001 | Dembo et al. |
| 6,164,533 | A | 12/2000 | Barton | 2001/0027441 A1 | 10/2001 | Wankmueller |
| 6,167,385 | A | 12/2000 | Hartley Urquhart | 2001/0034682 A1 | 10/2001 | Knight et al. |
| 6,169,975 | B1 | 1/2001 | White et al. | 2001/0037315 A1 | 11/2001 | Saliba et al. |
| 6,173,267 | B1 | 1/2001 | Cairns | 2001/0044293 A1 | 11/2001 | Morgan |
| 6,182,048 | B1 | 1/2001 | Osborn et al. | 2001/0047342 A1 | 11/2001 | Cuervo |
| 6,182,894 | B1 | 2/2001 | Hackett et al. | 2001/0054003 A1 | 12/2001 | Chien et al. |
| 6,186,793 | B1 | 2/2001 | Brubaker | 2001/0056398 A1 | 12/2001 | Scheirer |
| 6,189,787 | B1 | 2/2001 | Dorf | 2002/0019803 A1 | 2/2002 | Muller |
| 6,195,644 | B1 | 2/2001 | Bowie | 2002/0026418 A1 | 2/2002 | Koppel et al. |
| 6,202,053 | B1 | 3/2001 | Christiansen et al. | 2002/0046255 A1 | 4/2002 | Moore et al. |
| RE037,122 | E | 4/2001 | Levine et al. | 2002/0077978 A1 | 6/2002 | Oleary et al. |
| 6,227,447 | B1 | 5/2001 | Campisano | 2002/0091572 A1 | 7/2002 | Anderson et al. |
| 6,243,688 | B1 | 6/2001 | Kalina | 2002/0091631 A1 | 7/2002 | Usui |
| 6,263,316 | B1 | 7/2001 | Khan et al. | 2002/0095365 A1 | 7/2002 | Slavin |
| 6,265,977 | B1 | 7/2001 | Vega et al. | 2002/0104878 A1 | 8/2002 | Seifert et al. |
| 6,278,981 | B1 | 8/2001 | Dembo et al. | 2002/0116271 A1 | 8/2002 | Mankoff |
| 6,295,522 | B1 | 9/2001 | Boesch | 2002/0116330 A1 | 8/2002 | Hed et al. |
| 6,298,336 | B1 | 10/2001 | Davis et al. | 2002/0120627 A1 | 8/2002 | Mankoff |
| 6,308,268 | B1 | 10/2001 | Audebert | 2002/0120642 A1 | 8/2002 | Fetherston |
| 6,336,099 | B1 | 1/2002 | Barnett et al. | 2002/0143703 A1 | 10/2002 | Razvan |
| 6,341,724 | B2 | 1/2002 | Campisano | 2002/0147662 A1 | 10/2002 | Anderson |
| 6,343,743 | B1 | 2/2002 | Lamla | 2002/0165820 A1 | 11/2002 | Anvekar et al. |
| 6,345,261 | B1 | 2/2002 | Feidelson et al. | 2002/0174016 A1 | 11/2002 | Cuervo |
| 6,345,766 | B1 | 2/2002 | Taskett et al. | 2003/0004828 A1 | 1/2003 | Epstein |
| 6,349,291 | B1 | 2/2002 | Varma | 2003/0023549 A1 | 1/2003 | Armes et al. |
| 6,360,954 | B1 | 3/2002 | Barnardo | 2003/0028518 A1 | 2/2003 | Mankoff |
| 6,366,220 | B1 | 4/2002 | Elliott | 2003/0033211 A1 | 2/2003 | Haines et al. |
| 6,373,969 | B1 | 4/2002 | Adler | 2003/0033246 A1 | 2/2003 | Slater |
| 6,377,669 | B1 | 4/2002 | Walker et al. | 2003/0046249 A1 | 3/2003 | Wu |
| 6,385,591 | B1 | 5/2002 | Mankoff | 2003/0053609 A1 | 3/2003 | Risafi et al. |
| 6,386,444 | B1 | 5/2002 | Sullivan | 2003/0101119 A1 | 5/2003 | Persons et al. |
| 6,397,202 | B1 | 5/2002 | Higgins et al. | 2003/0105672 A1 | 6/2003 | Epstein et al. |
| 6,402,039 | B1 | 6/2002 | Freeman et al. | 2003/0135462 A1 | 7/2003 | Brake, Jr. et al. |
| 6,405,182 | B1 | 6/2002 | Cuervo | 2003/0140004 A1 | 7/2003 | Oleary et al. |
| 6,422,459 | B1 | 7/2002 | Kawan | 2003/0144935 A1 | 7/2003 | Sobek |
| 6,422,462 | B1 | 7/2002 | Cohen | 2003/0154125 A1 | 8/2003 | Mittal et al. |
| 6,424,029 | B1 | 7/2002 | Giesler | 2003/0163403 A1 | 8/2003 | Chen et al. |
| 6,429,927 | B1 | 8/2002 | Borza | 2003/0163416 A1 | 8/2003 | Kitajima |
| 6,434,259 | B1 | 8/2002 | Hamid | 2003/0172040 A1 | 9/2003 | Kemper et al. |
| 6,446,210 | B1 | 9/2002 | Borza | 2003/0195808 A1 | 10/2003 | Brown et al. |
| 6,450,407 | B1 | 9/2002 | Freeman et al. | 2003/0200143 A9 | 10/2003 | Walker et al. |
| 6,463,039 | B1 | 10/2002 | Ricci et al. | 2003/0200180 A1 | 10/2003 | Phelan et al. |
| 6,467,684 | B2 | 10/2002 | Fite et al. | 2003/0216965 A1 | 11/2003 | Libman |
| 6,473,500 | B1 | 10/2002 | Risafi et al. | 2004/0024672 A1 | 2/2004 | Brake, Jr. et al. |
| 6,484,144 | B2 | 11/2002 | Martin et al. | 2004/0030626 A1 | 2/2004 | Libman |
| 6,484,148 | B1 | 11/2002 | Boyd | 2004/0039588 A1 | 2/2004 | Libman |
| 6,498,861 | B1 | 12/2002 | Hamid | 2004/0098351 A1 | 5/2004 | Duke |
| 6,505,168 | B1 | 1/2003 | Rothman et al. | 2004/0243498 A1 | 12/2004 | Duke |
| 6,560,578 | B2 | 5/2003 | Eldering | 2005/0021400 A1 | 1/2005 | Postrel |
| 6,574,603 | B1 | 6/2003 | Dickson et al. | 2005/0027649 A1 | 2/2005 | Cech |
| 6,581,839 | B1 | 6/2003 | Lasch et al. | 2005/0071230 A1 | 3/2005 | Mankoff |
| 6,601,761 | B1 | 8/2003 | Katis | 2005/0075932 A1 | 4/2005 | Mankoff |
| 6,609,111 | B1 | 8/2003 | Bell | 2005/0091138 A1 | 4/2005 | Awatsu |
| 6,687,222 | B1 | 8/2003 | Mittal et al. | 2005/0171898 A1 | 8/2005 | Bishop et al. |
| RE038,255 | E | 9/2003 | Levine et al. | | | |
| 6,615,189 | B1 | 9/2003 | Phillips et al. | | FOREIGN PATENT DOCUMENTS | |
| 6,615,190 | B1 | 9/2003 | Slater | | | |
| 6,625,582 | B2 | 9/2003 | Richman et al. | EP | 959440 | 11/1999 |
| 6,631,849 | B2 | 10/2003 | Blossom | GB | 2275654 A | 9/1994 |
| 6,641,049 | B2 | 11/2003 | Luu | GB | 2376787 | 12/2002 |
| 6,641,050 | B2 | 11/2003 | Kelley et al. | GB | 2377071 | 12/2002 |
| 6,675,127 | B2 | 1/2004 | LaBlanc et al. | GB | 2377314 | 1/2003 |
| 6,693,544 | B1 | 2/2004 | Hebbecker | WO | WO 94/29112 | 12/1994 |
| 6,742,704 | B2 | 6/2004 | Fitzmaurice et al. | WO | WO 97/41673 | 11/1997 |
| 6,745,938 | B2 | 6/2004 | Sullivan | WO | WO 98/59307 | 12/1998 |

| | | |
|---|---|---|
| WO | WO 99/05633 | 2/1999 |
| WO | WO 01/69347 | 9/2001 |
| WO | WO 2005/043277 A3 | 5/2005 |

OTHER PUBLICATIONS

Credit Card News, "A store card issuer looks for lift from electronic gift certificates," Feb. 1, 1995, 2 pages.
"Associates First Capital Corporation", Hoover's Inc., The Industry Standard: The Newsmagazine of the Internet Economy, thestandard.net/companies/cpmpany-display, Apr. 6, 1999, 2 pages.
Brehl, "Banks issue cash-card pledge," The Toronto Star, Thursday, Oct. 9, 1997, 1 page.
Block, "Blockbuster running test of stored value card," The American Banker, Sep. 1, 1995, 2 pages.
Meece, "Boatmen's prepaid cards for worker-incentive firm," American Banker, Jul. 2, 1996, p. 12.
"Boatmen's floats stored value into the employee incentive waters," Debit card News, vol. 2, Issue 2, Jul. 16, 1996, 3 pages.
CardEx Incentives, The Future of Gifts & Incentives, Apr. 6, 1999, 15 pages.
Rosen, "Cash just isn't flexible enough," Express Technology, Friday, Feb. 10, 1995, 1 page.
Business Wire, Jan. 15, 1996, "CES/NaBANCO introduces stored value card technology; Blockbuster video is the first merchant partner," 2 pages.
Britt, "Competing in auto lending," America's Community Banker, vol. 5, No. 11, pp. 33-37, Nov. 1996.
Card News, "D.C. area Safeway stores look for increase in sales volume and revenue with cards," vol. 6, No. 25, ISSN: 0894-0797, Monday, Dec. 30, 1991, 3 pages.
Piskora, "Debit cards seen poised for new markets," American Banker, Credit/Debit/ATM's, Tuesday, Mar. 7, 1995, pp. 16.
Sanchez-Klein, "Electronic purse alliance planned," Computerworld, Jul. 29, 1998, printed Feb. 23, 2001, 2 pages.
Business Times, "Electronic purse can free you from ATM drag," printed Feb. 23, 2001, 1 page.
News Clippings, "Electronic purse card' to be launched tomorrow," New Straits Times, Sep. 18, 1999, printed Feb. 23, 2001, 3 pages.
Cards International, Jan. 30, 1996, "First data markets stored-value cards," p. 5.
Norris, First data unit develops blockbuster cash card, Omaha World Herald, Jan. 19, 1996, Sunrise Edition, p. 16.
Welcome to Card Express, The CardEx Incentive Card, as disclosed in the CardEx web site archived by web.archive.org on Feb. 7, 1998 [http://web.archive.org/web/*/http://www.cardex.com], retrieve Oct. 18, 2003, 8 pages.
Welcome to Card Express, CardEx web site archived by web.archive.org on Oct. 31, 1996 [http://web.archive.org/web/*/http://www.cardex.com], retrieve Oct. 18, 2003, 7 pages.
Jeffrey M. Lacker, "Stored Value Cards: Costly Private Substitutions for Government Currency", Economic Quarterly, 1996, 17 pages.
"The Evolution of a New Consumerism", Chain Store Age, vol. 73, pp. 8-9, Jun. 1997, 1 page.
Fickenscher, "Amex prepaid offering is latest card for firms regarding employees", American Banker, vol. 161, No. 151, Aug. 8, 1996, 2 pages.
"Welcome to Swiftgift", Swiftgift, www.swiftgiftcard.com, Dec. 8, 1998, 10 pages.
Lzarony, "Stuck for a gift? Give a prepaid credit card", www.bankrate.com, Dec. 21, 1998, 1 page.
Coulton, "Incentives field moving to card-based series 14", American Banker, Mar. 26, 1998, 3 pages.
Business Travel News, "Maritz gets mastercard's stamp of approval", Aug. 19, 1996, 2 pages.
Spurgin, "Sopininmon! or What's happening in the retail credit card environment", Credit World Journal, Apr. 1997, 7 pages.
AT&T Marketing, "Universal card free lifetime membership extended 3 months", www.att.com/press/0297/970217.csa.html, Dec. 4, 1990, 2 pages.
Chain Store Age Executive with Shopping Center Age, "More retailers turn to co-branding", Feb. 1, 1995, 3 pages.

Introducing SpendingMoney(TM), Armetta: Marketing & Design Product Concept Report, Oct. 9, 1996, 15 pages.
First USA Platinum Connect, First USA Bank, First USA Promotional Mailing, Oct. 1997, 6 pages.
Introducing the First USA Platinum Connect card, First USA Promotional Mailing, Dec. 1997, 6 pages.
Here's the calling convenience you asked for: 1-800-call-AT&T . . . For All Calls, Appendix A: For Card Carriers, 7 pages.
Miriam Krenin Souccar, Smart Cards: 1st Union Smart Card Pilot Enlists a Second Army Base, American Banker, 3 pages.
First Union Issues Smart Cards to Fort Benning Recruits, CardFax, 1 page, Mar. 26, 1999.
Emerson Brown and Jim Baum, Purchasing Card Magic: Eli Lilly Finds Accounts Payable Flying High With Plastic, Corporate Cashflow, 4 pages, Nov. 1994.
Christine Dugas, Payroll May Ask: Paper or Plastic?, USA Today, 3B, Aug. 14, 2001, 1 page.
Rachel Konrad, Associated Press, IBM had a bunch of unusual ideas in 2003, printed from Philly.com on Jan. 21, 2004, posted on Tues., Jan. 13, 2004, 2 pages.
Incentive firms finds debit cards a rewarding experience (Off-line debit card issuers converge efforts with companies looking for effective incentives to boost employee productivity and to motivate individuals to buy their products), Debit Card News, vol. 3, No. 11, Nov. 28, 1997, (Author unknown), 3 pages.
News Release, For Release: Monday, Feb. 17, 1997, New 1-800-Call-ATT campaign promotes one number for all calls, 2 pages.
S. P. Miller et al., Section E.2.1: Kerberos Authentication and Authorization System, Project Athena, Cambridge, Massachusetts, Dec. 21, 1987, 39 pages.
Swift Gift 'Wows' Internet Shoppers, Wed., Dec. 2, 1998, PR Newswire, 1 page (Author Unknown).
ECARD, Frequently asked questions, printed Feb. 23, 2001, 7 pages.
Machilis, Computerworld, "Have it the 'smart' way: Burger King program drives smart-card use,", printed Feb. 23, 2001, 1 page.
Press Release, Mar. 5, 2004, Payment data systems files patent on debit card payment solution, American City Business Journals, 1 page.
Press release '99, "Proton world and Europay to co-operate in creation of new CEPS-compliant E-purse application," printed Feb. 23, 2001, Waterloo, Belgium, Jun. 28, 1999, 2 pages.
SCIA (Smart Card Industry Association), About Smart Cards, "Electronic Purse," printed Feb. 23, 2001, www.scia.org, 1 page.
Cordis, PACE IST-1999-11531 PACE, "Purse application for cross border use in euro," printed Feb. 23, 2001, www.cordis.lu, 3 pages.
SK100 Smart Card Electronic Purse Balance Reader, printed Feb. 23, 2001, 1 page.
Press Release, Apr. 21, 1997, Smart card for loyalty and e-purse applications eclipses capability of conventional mag-stripe cards, printed Feb. 23, 2001, 3 pages, www.1.slb.com.
SmartAxis, Load cash on to your e-purse card, Supported Currencies and Schemes, printed Feb. 23, 2001, www.smartaxis.co.uk, 9 pages.
"The Electronic Purse Reaches the Car Park", printed Feb. 23, 2001, 2 pages.
Stuber, Bank of Canada, "The electronic purse: An overview of recent developments and issues," Technical Report No. 74, Jan. 1996, printed Feb. 23, 2001, www.bankofcanada.ca, 2 pages.
ICL, Understanding the benefits, "Smartcity offers a number of important benefits to both the card issuers and the customers," printed Feb. 27, 2001, www.icl.com, 2 pages.
Visa first to launch electronic purse load via GSM mobile phone, Johannesburg, Apr. 7, 1999, printed Feb. 23, 2001, www.cellular.com, 4 pages.
Hansell, New York Times, "Visa to unveil electronic purse cards," printed Feb. 23, 2001, 2 pages.
Machlis et al., "Will smart cards replace ATMs?," Computerworld, printed Feb. 23, 2001, 3 pages.
Hotchkiss, D. Anne, "ATM's at the head of their class," Bank Marketing, vol. 29, No. 3, pp. 26-32, Mar. 1997.

5500—FDIC General Counsel's Opinion No. 8—Stored Value Cards, 61 Fed. Reg. 40490, http://www.fdic.gov/regulations/laws/rules/5500-500.html, Aug. 2, 1996.

Edwards, ATMs The Hot New Media Buy, ABA Banking Journal, Mar. 1999, pp. 58, 60.

Neumann, An Enhanced Neural Network Technique for Software Risk Analysis, IEEE Transactions on Software Engineering, vol. 28, No. 9, Sep. 1, 2002, pp. 904-912.

Award Card Comparison, JA7922.

CardFlash, Apr. 5, 2005.

Vandenengel, Cards on the Internet: Advertising on a $3 Bill, Industry Intelligence, Feb. 1, 1995, pp. 46-48.

Kutler, Cash Card Creator Looking Beyond Mondex, Feb. 9, 1995.

Bank, Cash, Check,Charge—What's Next ?, Seattle Times, Mar. 6, 1995.

Morgan et al., Categorizing Risks for Risk Ranking, vol. 20, No. 1, Jun. 22, 2005, pp. 49-58.

Common electronic purse specifications, Business Requirements, Version 6.0, Dec. 1998.

Guidotti, Comparing Environmental risks: A Consultative Approach to Setting Priorities at the Community Level, Public Health Rev 1994, vol. 22, Jun. 16, 2005, pp. 321-337.

Britt, Competing in Auto Lending, America's Community Banker, vol. 5, No. 11, Nov. 1, 1996, pp. 33-37.

Consortium created to manage common electronic purse specification, Cardtech Securtech, Chicago, www.visa.com/av/news/PRmisc051199.vhtml, May 11, 1999.

Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.

Lamond, Credit Card Transactions Real World and Online, Paying By Credit Card-Real World and Online, http://www.virtualschool.edu/mon/ElectronicProperty/klamond/credit, printed Jul. 8, 2005, 17 pages.

E-Z Pass, Web page, http://www.ezpass.com-Disc_portNewYork.html, Nov. 12, 2001.

E-Z Pass, Web page, http:\\www.ezpass.com-Disc_ny_annual.html, Nov. 12, 2001.

E-Z Pass, Web page, http:\\www.ezpass.com-frameMain.html, Nov. 12, 2001.

E-Z Pass, Web page, http:\\www.ezpass.com-whatis.html, Nov. 12, 2001.

First USA—Activate Today and Get One Hour Free Calling Card Calls, Call 1-800-555-2535, First USA, 6 pages.

First USA—Call 1(800)335-2453 To Receive One Free Hour of Domestic Long Distance Calling (No Strings Attached), First USA, 6 pages.

Hoovers, General Mills, Inc. Corporate Profile relied upon to show the history of the company, http:/cobrands.hoovers.com/global/cobrands/proquest/history.xhtml?COID=10639, Jul. 12, 2005, 2 pages.

How Is It Different?, JA8331.

Incenticard, Bellsouth, JA8329.

Key Bank Holiday Offer, http://www.key.com/swiftgift/home.html, printed Apr. 5, 1999.

MailFrontier Survey Finds that Consumers Hold Financial Institutions Accountable for Online Identitiy Theft, www.mailfrontier.com, Palo Alto, CA, Nov. 2004.

Meridian Award Cards, JA8251.

Meridian-the leader in card marketing, JA8343.

Meridicard vs. Debit Cards, JA7917.

Clark, Microsoft, Visa to Jointly Develop PC Electronic-Shopping Software, The Wall Street Journal, Nov. 9, 1994, WSJ B9.

Bogle, Mutual Funds at the Millennium: Fund Directors and Fund Myths, The Vanguard Group to the '40 Act Institute of PLI (Practicing Law Institute), New York, NY, May 15, 2000, 15 pages.

Schwab, Charles, Now 7 Ways For A better Total Return For Your Money; Schwat 1, The Inventor's Asset Management Account, Charles R. Schwab, Charles Schwab & Co., Inc., 16 pages.

Smart Cards: Big Brother's Little Helpers, The Privacy Committee of New South Wales, No. 66, Aug. 1995.

The Campus Card Conundrum, Card Technology, Journal ISSN: 1093-1279, p 25+, Feb. 1998, pp. 1-8.

Stoughton, The Gift of Credit, www.washingtonpost.com/wp-srv/business, Dec. 14, 1998.

Langheinrich et al., Unintrusive Customization Techniques for Web Advertising, Computer Networks, vol. 31, 1999, pp. 1259-1272.

Visa Cash—Where can I get it?, www.visa-asia.com/pd/cash/where.html, Feb. 23, 2001.

Visa Cash, www.visa-asia.com/pd/cash/main.html, Feb. 23, 2001.

Visa International And SERMEPA Announce Plans For Cross Border Visa Cash Based On CEPS, www.visa.com/av/news/praaamisc111699.vhtml, Nov. 16, 1999.

Visa releases visa cash electronic purse specifications based on CEPS, www.visa.com/av/news/PRaamisc042099.vhtml, San Francisco, Apr. 20, 1999.

Card Based Award Systems, JA8309.

* cited by examiner

DEBIT PURCHASING OF STORED VALUE CARD FOR USE BY AND/OR DELIVERY TO OTHERS

RELATED APPLICATIONS

This application is a continuation of application Ser. No. 10/441,067, filed May 20, 2003, now U.S. Pat. No. 6,892,187, which is a continuation of application Ser. No. 09/102,044, filed Jun. 22, 1998, now U.S. Pat. No. 6,615,189.

FIELD OF THE INVENTION

This invention relates to a system for purchasing or transferring of stored value or debit purchasing cards, which can be pre-arranged to be given as a gift to a designated recipient.

BACKGROUND OF THE INVENTION

On many occasions, consumers, other bank customers, credit card holders, and other persons find it is desirable to arrange for another person, perhaps a relative, to have access to a specified sum of money. For example, a parent might want to arrange for a child to have access to money when the child is taking a trip or going away to college. One may also find it desirable to mail a gift to another person who is geographically distant. In these and other cases, it is often undesirable to give away or send cash. If lost or stolen, cash is practically unrecoverable. Traveler's checks are also undesirable as they must be purchased at a bank and are not acceptable for many types of purchases. Gift certificates are also undesirable because they require the recipient to purchase from the merchant that issued the gift certificate. These and other drawbacks exist to the aforementioned alternatives.

SUMMARY OF THE INVENTION

An object of the invention is to overcome these and other drawbacks in existing purchase schemes.

Another object of the invention is to provide a method for issuing a purchase card comprising: presenting a purchaser with the opportunity to buy the purchase card, determining whether the purchaser has sufficient funds to pay for the purchase card, creating a purchase card account for a recipient designated by the purchaser; and issuing the purchase card.

A further object of the invention is to provide a purchase card where the recipient activates the purchase card.

A further object of the invention is to provide a purchase card where the purchase card account contains a monetary amount determined by the purchaser of the purchase card.

A further object of the invention is to provide a purchase card where money can be added to the balance of an issued purchase card account.

A further object of the invention is to provide a purchase card where the purchase card is activated when the issuer of the purchase card is notified that the recipient has received the purchase card.

A further object of the invention is to provide a purchase card where the issuer of the purchase card notifies the purchaser that the recipient has received the purchase card.

A further object of the invention is to provide a purchase card where the purchaser may designate with which merchants the purchase card may be used.

A further object of the invention is to provide a purchase card where the purchase card is activated for a predetermined period of time.

Another object is to provide a method for issuing a purchase card as a rebate award comprising: issuing a credit card to a cardholder, said credit card being associated with a sponsor, calculating a rebate amount based upon cardholder purchases made with said credit card, issuing a purchase card to a cardholder or to a recipient designated by said cardholder, said purchase card having a purchase value determined by said rebate amount.

A further object of the invention is to provide a purchase card where the recipient of the purchase card activates the card.

A further object of the invention is to provide a purchase card where the recipient activates the purchase card by notifying the issuer that the recipient has received the purchase card.

A further object of the invention is to provide a purchase card where the purchase card is activated for a predetermined period of time.

A further object of the invention is to provide a purchase card where the rebate is calculated based on all purchases made with the credit card.

A further object of the invention is to provide a purchase card where the rebate is calculated based on purchase from the sponsor made with the credit card.

A further object of the invention is to provide a purchase card where the sponsor notifies the issuer of the amount of rebate due a credit card holder, and the issuer creates a purchase card in that amount.

A further object of the invention is to provide a purchase card where the rebate is based on the monetary value of the purchases.

Another object of the present invention is to provide a method for converting a purchase card into a credit card comprising: creating a purchase card account for a recipient designated by the purchaser; issuing the purchase card; receiving a request from the recipient to convert the purchase card into a credit card; determining whether the recipient meets predetermined credit criteria to convert the purchase card into a credit card; creating a credit card account; and converting the purchase card into a credit card.

A further object of the invention is to provide a purchase card where the balance of the purchase card account is transferred to the credit card account.

A further object of the invention is to provide a purchase card where the credit cards is immediately activated upon being converted from a purchase card.

Other objects and advantages exist for the present invention.

DETAILED DESCRIPTION OF THE PREFERRED EMBODIMENTS

Figure 1:
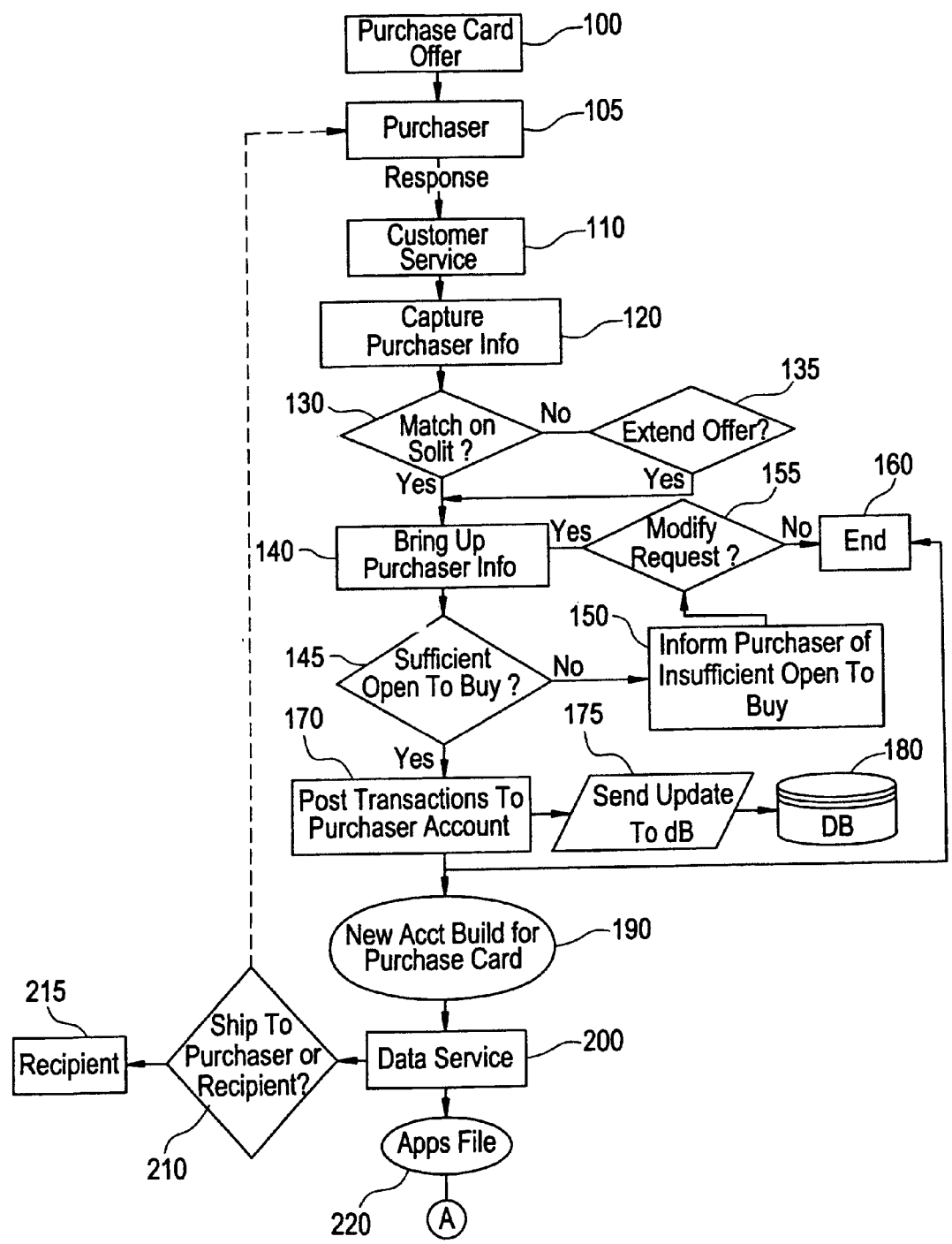
FIG. 1 shows a flow diagram for a portion of the purchase card system.

One embodiment of the purchase card system is shown in FIG. 1. In this embodiment the purchase card process begins with an offer to purchase a gift card at step 100. The offer may be in any suitable form that would notify prospective purchasers 105 of the availability of the purchase card. For example, a written solicitation may be mailed or otherwise distributed to potential purchasers 105. The offer may also be in the form of oral notification, for example, a telephone call to prospective purchasers 105. Alternatively, the offer may be published over a computer network, for example, on an Internet Web site. Other forms of offering the sale of a purchase card are also possible. In one embodiment of the invention, offers are made to prospective purchasers who already have a financial relationship with the offeror. Other potential purchasers may also be offered the opportunity to obtain a purchase card.

The offer may be accepted by a purchaser 105 by notifying a customer service center 110. The acceptance may be in any form acceptable to the customer service center 110. For example, the purchaser may mail, fax, or otherwise transmit a written acceptance, telephone an acceptance, or electronically transmit, for example, via Web Site, an acceptance by computer or other suitable device. At step 120, the customer service center 110 receives pertinent information to identify the purchaser 105 and the purchaser's desired spending limit for the purchase card. For example, the customer service center may identify the purchaser 105 by name, address, credit card account number, social security number, other unique identifiers or a combination of identifiers.

At step 130, the customer service center 120 is checked to verify that the caller or purchaser was included in the solicitations for this program. If the caller or purchaser was not originally solicited, customer service 120 determines whether to extend an offer in step 135.

If the caller or purchaser was solicited 130, certain purchaser 105 information may be accessed at 140. If, for example, the purchaser wishes to pay for the purchase card with a credit card, the purchaser's credit card account information may be accessed. For example, the purchaser's available credit limit may be accessed at 145 to verify that sufficient credit is available to cover the spending amount of the purchase card. If the available credit is insufficient, the purchaser 105 may be so informed at 150. The purchaser 105 may be given the opportunity to modify the purchase card spending amount, at 155, in order to ensure that the purchase amount does not exceed the available credit.

The process may terminate at 160 if, for example, the purchaser 105 does not wish to modify the purchase amount.

After it has been determined that the purchaser's available credit is sufficient, a transaction may be posted to the purchaser's credit card for the amount of the purchase at 170. In another embodiment of the present invention, a purchaser may use a check, cash, or other financial methods to obtain a purchase card. Regardless of the purchasing method, the issuer of the purchase card must determine whether the purchaser has sufficient funds to purchase the card.

When the purchase card is paid for by credit or bank account, the purchaser's account balance is updated at 175 to reflect the purchase. The account balance information, as well as information identifying the purchaser 105 and the recipient, may be stored in a retrievable and accessible fashion. For example, the information may be stored in computer database 180. After the purchaser 105 has paid (or authorized payment) for the purchase card, and it is posted to a credit card account, the acceptance process is complete and the acceptance process terminates at 160.

An account for the purchase card is created at 190. This may be performed by a third party processor that establishes and manages purchase card accounts, for example, at 200. Creation of the purchase card account may comprise various actions, such as, recording the recipients 215 name, address and phone number, imprinting a card with an account number, a recipient name and an expiration date, encoding the card to record the purchase value stored thereon, and other actions, such as, for example, preparing account fulfillment documents (e.g. card carrier activation, etc.).

When the purchase card account is complete, the card is delivered. In one embodiment of the invention, card may be affiliated with a particular network, such a credit network, or debit network. For example, a card may be affiliated with the VISA® network. The delivery may be to the purchaser 105 or to the recipient 215, as shown at 210. The place of delivery may be arranged during the initial purchase of the card or other suitable time before delivery.

Information regarding an account is sent to account file 220, where an account can be monitored. In one embodiment, account file 220 allows monitoring of the current balance of an account, any activity in the account, including debits and credits, transaction updates, and the like. Other information about an account, such as purchase dispute resolutions, the history provided by the customer, and account status, may also be monitored.

Figure 2:
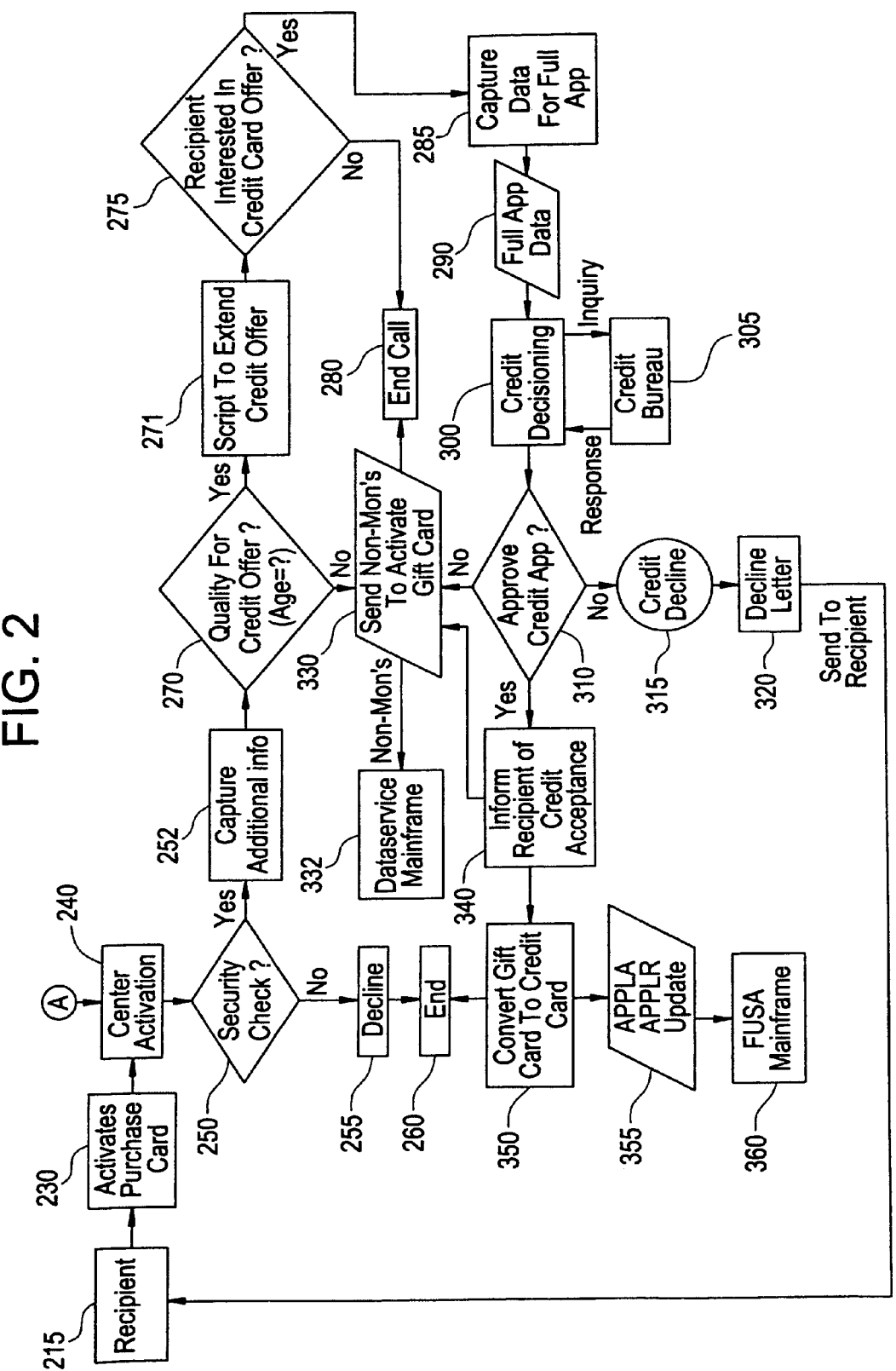
FIG. 2 shows a flow diagram for another portion of the purchase card system.

Before the purchase card can be used to make purchases, it must be activated as shown in FIG. 2 at 230. Activation may be accomplished in any suitable manner. For example, the recipient 215 of the card may place a telephone call to an activation center 240. Activation center 240 may act as a telemarketing vendor by verifying information about the recipient (i.e. name, address, telephone number, etc.) before the purchase card is activated. The activation center 240 may then transmit the data about the recipient to Data Service 200 to activate the purchase card for use. Activation center 240 may also modify information about a recipient, such as, for example, a change of address. Other forms of activation, such as by computer network may also be used.

During activation certain verifications may be made at 250 to ensure that the intended recipient 215 is the person attempting to activate the purchase card. These security checks 250 may entail questions about personal information (e.g., name, address, telephone number, etc.) or may utilize other well known methods of authenticating the recipient 215. If the person attempting to activate the purchase card does not pass the security check 250, the purchase card will be denied activation at 255 and the activation process may terminate at 260. If the person attempting to activate the purchase card passes the security check 250, they may be prompted at 252 for more information. The information may be used for subsequent security checks, should they be required, or to verify or complete the purchase card account information.

After activation the purchase card is ready for use. In some embodiments of the invention the activation process will end at this point. The recipient 215 may now use the purchase card to make purchases where ever, for example, VISA® cards are accepted. Each time a purchase is made using the card, the amount of the purchase will be debited from the card's available balance. The purchase card will continue to operate as long as a positive balance remains on the card. Some embodiments of the purchase card may have the capacity to have additional purchase value added to them after they have been activated.

If the recipient of a purchase card is someone other than the purchaser, the issuer of the card may notify the purchaser regarding various aspects of the card. For example, in one embodiment of the invention, the issuer could notify the purchaser that the purchase card has been received and activated by the intended recipient. An issuer may also notify a purchaser where the purchase card is being used, or what products are being purchased with the purchase card.

Some embodiments of the purchase card will include an expiration date. After the expiration date has passed the purchase card will be de-activated and cease to operate. In another embodiment of the present invention, a recipient or a purchaser of a purchase card may add to the balance of the purchase card account. This may take place in a manner substantially similar to the original purchasing of the purchase card. For example, a recipient of a purchase card may request that an amount be posted to the recipient's credit card and that the same amount then be credited to the recipient's purchase card account. Other methods of adding to the balance of a purchase card account may also be used.

Another embodiment of the invention allows the recipient 215 to convert the purchase card into a credit card. Conversion may be accomplished in the following manner. The recipient 215 calls the activation center 240 to activate the purchase card and the security check 250 may be performed in the usual manner. After passing the security check, the age of the recipient 215 is determined at 270. If the recipient 215 is an adult (e.g., over the age of 18) an offer to convert the purchase card into a credit card may be extended at 271. At step 275 the recipient 215 may decline the offer to convert, in which case the process may terminate at 280. If the recipient 215 elects to convert the purchase card to a credit card the activation center 240 may capture additional data 285 from recipient 215, in order to complete a credit card application. At step 290 the credit card application data is forwarded to a credit decisioning office 300. The credit decisioning office 300 may make inquiries to a credit bureau 305, for example, obtaining a credit report on the recipient 215. At 310 the decision is rendered whether to approve the credit card application. If the application for a credit card is declined at 315, the recipient 215 may be notified at 320. Notification may be in any suitable form, for example, a letter explaining the declined application may be mailed at 320 to the recipient 215. Other forms of notification may also be used to notify recipient 215 of the declined application.

Even though the credit card application is declined at 310, the purchase card is activated for use. At 330, the account settings allowing a card to be used at merchants are sent to the data service 200 and the card will be activated as a purchase card account. Information pertaining to the purchase card account is stored in a retrievable and accessible manner. For example, the purchase card account information may be stored in a computer 332.

If the decision at 310 is to accept the application for a credit card, the recipient 215 may be notified at 340. Again, notification may be in any suitable form, for example, a letter or other suitable notification. Regardless of the decision whether to convert the purchase card into a credit card, the purchase card is activated at the end of the activation call. If the purchase card is not already active, it may be activated at 345. At 350 the purchase card is converted to a credit card. The credit card will function in a manner usual for such credit instruments. For example, a credit limit may be assigned, periodic account activity statements may be generated and finance charges may be applied to any outstanding balance. In one embodiment, any remaining balance from the purchase card account may be transferred and applied to the credit card account. At 355 an update is sent to a retrievable data storage system, for example, computer 360. The update 355 sends credit card application decisions into a database.

In another embodiment of the purchase card, a financial institution (e.g., a bank) issues a credit card to a cardholder. The card may be a co-branded card issued in cooperation with a sponsor. In this embodiment, the sponsor offers a rebate to the cardholder based upon the dollar value amount of purchases made with the co-branded credit card. The rebate may apply to all purchases made or just to purchases made from the sponsor. The rebate may be calculated in a manner specified by the terms of the cardholder agreement or other disclosures to the cardholder. In one embodiment of the invention, disclosure about the rebate is provided to the cardholder in a separate form included with the cardholder agreement. For example, the sponsor may offer a flat percentage rebate for purchases made. In one embodiment of the invention, the card issuer calculates the rebate due the cardholder based on the balance paid.

In another embodiment, the sponsor notifies the financial institution of the amount of rebate to be awarded to the cardholder. The financial institution will then issue a purchase card for the amount of the rebate. The purchase card may be used for purchases in the above described manner, for example, everywhere VISA® is accepted, or the purchase card may be used for purchases solely with the sponsor or other designated entities.

Other embodiments and uses of the invention will be apparent to those skilled in the art from consideration of the specification and practice of the invention disclosed herein. The specification and examples should be considered exemplary only. The scope of the invention is only limited by the claims appended hereto.

What is claimed is:

1. A method for distributing a stored value card comprising:
    receiving a payment of funds from a customer, wherein the payment is for the purchase of a stored value card by the customer;
    receiving authentication information associated with the stored value card;
    creating an independent and separate stored value card account associated with the stored value card, comprising:
        a) a balance based on a payment of funds;
        b) the stored value card authentication information; and
        c) stored value card account information;
    wherein the customer is provided with the option of identifying the customer or a separate person as a recipient;
    passing stored value card account creation information from a stored value card account vending entity to a central processor;
    storing the balance, the stored value card authentication information and the stored value card account information in a database;
    marking the name of the recipient on the stored value card before issuance;
    issuing the stored value card to the recipient;
    activating the stored value card; and
    reloading the stored value card upon receiving a reload request.

2. The method of claim 1, wherein the customer purchases and uses the card.

3. The method of claim 1, further comprising:
    after activating the stored value card, adding funds to the stored value account by the customer.

4. The method of claim 1, further comprising:
    after activating the stored value card, adding funds to the stored value account by the separate person.

5. The method of claim 1, wherein the recipient and the customer are the same entity.

6. The method of claim 1, wherein the recipient is designated by the purchaser, and wherein the recipient and the customer are different entities.

7. The method of claim 1, wherein the recipient and the customer are the same entity.

8. The method of claim 1, wherein the act of activating occurs after the act of issuing.

9. The method of claim 1, further comprising:
verifying the identity of the recipient, wherein the act of activating the card is based on the act of verifying the identify of the recipient.

10. The method of claim 1, further comprising:
receiving from the customer a designation of a plurality of merchants where the stored value card may be used in transactions.

11. The method of claim 1, further comprising:
after providing the card to the recipient, notifying the customer that the recipient has received the card.

12. The method of claim 1, wherein the stored value card is marked with the designated recipient's name and at least one of (i) identification indicia of a predetermined credit network through which the stored value card can be used to effectuate transactions and (ii) the issuer identification indicia, and wherein the stored value card is accepted for purchases anywhere the predetermined credit network is accepted for purchases.

13. A system for distributing a stored value card comprising:
an input device configured to receive a request to create an independent and separate stored value card account associated with a stored value card, wherein the request is associated with a request to purchase a stored value card by a purchaser for a recipient, wherein the stored value card account comprises:
a) a balance based on a payment of funds,
b) stored value card authentication information, and
c) stored value card account information;
wherein the purchaser is provided with the option of identifying the purchaser or a separate person as the recipient;
a central processor configured to: (1) create the independent and separate stored value card account for the stored value card, (2) store the balance, the stored value card authentication information, and the stored value card account information in a database, (3) activate the independent and separate stored value card account, (4) issue the stored value card to the recipient, wherein the stored value card is marked with the name of the recipient before issuance, and (5) reload the stored value card upon receiving a reload request; and
a communication link between the input device and the central processor configured to pass the request.

14. A method for distributing a stored value card comprising:
receiving a payment of funds from a customer, wherein the payment is for the purchase of a stored value card by the customer;
receiving authentication information associated with the stored value card;
creating an independent and separate stored value card account associated with the stored value card, comprising:
a) a balance based on a payment of funds;
b) the stored value card authentication information; and
c) stored value card account information;

wherein the customer is provided with the option of identifying the customer or a separate person as a recipient;
passing stored value card account creation information from a stored value card account vending entity to a central processor;
storing the balance, the stored value card authentication information and the stored value card account information in a database;
marking the name of the recipient on the stored value card before the card is issued;
issuing the stored value card;
activating the stored value card; and
reloading the stored value card upon receiving a reload request.

15. The method of claim 14, wherein the customer purchases and uses the card.

16. The method of claim 14, wherein the customer purchases the card and designates a recipient to use the card, wherein the recipient is different from the customer.

17. A method for distributing a stored value card comprising:
receiving a request to create an independent and separate stored value card account associated with a stored value card, wherein the request is associated with a request to purchase a stored value card by a purchaser, wherein the independent and separate stored value card account comprises:
a) a balance based on a payment of funds,
b) stored value card authentication information, and
c) stored value card account information;
wherein the purchaser is provided with the option of identifying the purchaser or a separate person as a recipient;
creating the independent and separate account for the stored value card and storing the balance, the stored value card authentication information, and the stored value card account information in a database;
activating the independent and separate account;
marking the name of the recipient on the stored value card before the card is issued;
issuing the card to the recipient; and
reloading the stored value card upon receiving a reload request.

18. A method for distributing a stored value card comprising:
receiving a payment of funds from a customer, wherein the payment is for the purchase of a stored value card by the customer;
receiving authentication information associated with the stored value card;
prior to activation of the stored value card, creating an independent and separate stored value card account associated with the stored value card, comprising:
a) a balance based on a payment of funds;
b) the stored value card authentication information; and
c) stored value card account information;
wherein the customer is provided with the option of identifying the customer or a separate person as a recipient;
passing stored value card account creation information from a stored value card account vending entity to a central processor;

storing the balance, the stored value card authentication information and the stored value card account information in a database;

identifying the recipient's name for the stored value card before the card is issued;

issuing the stored value card to the recipient;

verifying the identity of the recipient;

activating the stored value card based on the act of verifying;

receiving notification that the recipient has received the stored value card; and adding value to the amount after the act of activating.

* * * * *